United States Patent [19]

Short et al.

[11] Patent Number: 5,027,403
[45] Date of Patent: Jun. 25, 1991

[54] VIDEO SOUND

[75] Inventors: William Short; Christopher Ickler; Timothy Holl; William Keezer, all of Framingham, Mass.

[73] Assignee: Bose Corporation, Framingham, Mass.

[21] Appl. No.: 469,689

[22] Filed: Jan. 26, 1990

Related U.S. Application Data

[63] Continuation of Ser. No. 274,381, Nov. 21, 1988, abandoned.

[51] Int. Cl.$^5$ .............................................. H04R 5/02
[52] U.S. Cl. ......................................... 381/24; 381/27
[58] Field of Search ..................... 381/1, 18, 22, 24, 27

[56] References Cited

U.S. PATENT DOCUMENTS

| | | | |
|---|---|---|---|
| 4,179,585 | 12/1979 | Herrenschmidt | 381/90 |
| 4,410,761 | 10/1983 | Schickedanz | 381/24 |
| 4,638,505 | 1/1987 | Polk et al. | 381/24 |
| 4,691,362 | 9/1987 | Eberbach | 381/24 |

FOREIGN PATENT DOCUMENTS

| | | | |
|---|---|---|---|
| 0003600 | 1/1986 | Japan | 381/24 |
| 0237597 | 10/1986 | Japan | 381/24 |
| 2102243 | 1/1983 | United Kingdom | 381/24 |
| 2185655 | 7/1987 | United Kingdom | 381/24 |

Primary Examiner—Forester W. Isen
Attorney, Agent, or Firm—Fish & Richardson

[57] ABSTRACT

A sound projection apparatus for a video display device having left and right speakers, first and second ambience speakers, and an amplifier having a right channel and left channel. In this system, connection of the left channel to a speaker produces a left signal; the right channel to a speaker produces a right signal; the left and right channels to ambience circuitry produces an ambience channel; the ambience channel to the positive input of the first ambience speaker produces a first ambience signal and the ambience channel to the negative input of the second ambience speaker produces a second ambience signal. The left and right speakers are forward facing, projecting sound directly from the television to a viewer. The first and second ambience speakers are side or rearward facing, projecting sound indirectly to the viewer. The projection apparatus may be formed as a single cohesive unit, within or near the television.

23 Claims, 1 Drawing Sheet

VIDEO SOUND

This application is a continuation of Ser. No. 07/274,381, filed Nov. 21, 1988, now abandoned.

BACKGROUND OF THE INVENTION

This invention relates to apparatus for improving video sound.

Commonly, televisions are provided with a single speaker or with a pair of left and right speakers, which are designed to project sound towards a viewer. External speakers may be spaced at some distance to either side of a television set. Speakers may also be provided which reflect, or partially reflect, sound from the walls of a room to the viewer.

"Surround sound" systems have two or more pairs of speakers, one pair of which is located behind the viewer, and the remaining speakers reproducing left and right stereo signals with or without a center monophonic channel. Similarly, the "dyna quad" system has two rear and two front speakers, with the rear speakers connected such that the positive input of one speaker is connected to the left positive output of an amplifier, and the negative input to the right positive output of the amplifier (to provide an L-R signal); the other speaker is connected between the same two outputs but in the opposite polarity, to produce an R-L signal. Both of these approaches attempt to improve the spatial presentation of video programming by adding a rear channel.

SUMMARY OF THE INVENTION

The invention features a sound projection apparatus for a video display apparatus having left and right speakers and first and second ambience speakers, and an amplifier having a right channel and a left channel. In this system, connection of the left channel to the left speaker produces a left signal; the right channel to the right speaker produces a right signal; the right channel and the left channel to an ambience circuit produces an ambience channel; the ambience channel to a positive input of the first ambience speaker produces a first, such as an L-R, ambience signal; and the ambience channel to a negative input of the second ambience speaker produces a second, such as an R-L, ambience signal. The first pair of speakers are forward facing, projecting sound directly from the video display apparatus to a viewer and connected to the amplifier to produce the left and right signals, respectively. The second pair of speakers are front, side, or rearward facing, depending on transducer placement, projecting sound indirectly to the viewer, and connected to the amplifier to produce the L-R and R-L signals, respectively. The audio projection apparatus may be formed as a single cohesive unit, within or near the video display apparatus.

In preferred embodiments, the first pair of speakers is positioned such that the speaker producing the left signal is to the left of the speaker producing the right signal; the second pair of speakers is positioned such that the speaker producing the L-R signal is to the left side of the speaker producing the R-L signal; the speakers may be tweeters for radiating sound energy having spectral components of frequencies above the bass frequency range, and the apparatus further includes a woofer for radiating sound energy having spectral components of frequencies below those radiated by the tweeter; the first pair of speakers face along a line between 0°-45° from a plane drawn perpendicular to the viewing plane of the video display apparatus; the second pair of speakers do not face forward along the line between 0° and 45° from a plane drawn perpendicular to the viewing plane of the video display apparatus; most preferably the second pair of speakers face sideways along the line between 0° to 45° from the viewing plane of the video display apparatus; and the amplifier also has a difference channel.

The invention also features a method for producing an improved sound from a video display apparatus including the steps of radiating sound energy directly from the video display apparatus to a viewer through the first pair of speakers, energizing left and right speakers of the first pair with left (L) and right (R) audio signals respectively, radiating sound energy indirectly to the viewer through the second pair of speakers, and energizing left and right speakers of the second pair with L-R and R-L signals, respectively.

This invention represents a solution to the problem of deficient video sound reproduction. Two channels of sound reproduction are unable to faithfully reproduce the intended perception of breadth of audio image for its stereo component while maintaining a proper sensation of precise on-screen localization for its monophonic component. In typical movie theater sound systems, a full bandwidth monophonic center channel speaker system behind the center of the screen reproduces center screen sound information. Full bandwidth left and right speaker systems, located behind the left and right side of the screen, respectively, reproduce sound information which is to the extreme left or right, whether it has on or off screen visual associations.

In this invention, a viewer perceives dialogue as originating directly from the center of the video display even when sitting off-center. Unlike a movie theater system, designed for playback as three frontal channels, video recording format and broadcast provides not more than two channels of high fidelity sound. A conventional system may either provide a broad sound image with poor monophonic center localization, or a narrow sound image with monophonic information, such as dialogue, emanating from the center of the screen. Merely synthesizing a monophonic center channel and adding it to a stereo pair of speakers would not solve the problem. More recent development of "steering logic" surround decoders attempt to improve the frontal stereo image through enhanced separation of the left, right and derived monophonic center channels for the frontal audio system.

A video image typically subtends a relatively small field of view, in part because of relatively small aspect ratio of width to height for the screen, and in part because of the preferred minimum distance between the viewing screen and viewer for comfort and perceived picture clarity. The present invention allows a viewer to perceive a sense of on-screen localization of dialogue and a sense of breadth to the stereo image which extends beyond the width of the video display screen.

Television broadcasts carry on-screen dialogue (and other information) as a monophonic signal mixed equally into the left and right channels for broadcast. If produced within accepted guidelines, all stereo video material has a stereo and monophonic content which varies depending upon the producer's intent and the ratio of "on-screen" to ambience content. This invention enables the viewer to always perceive dialogue and similar material as originating from the center of the viewing area, regardless of the viewer's seating position, while simultaneously providing a wide perceived audio image for all other ambient material.

When watching a movie program, the viewer perceives a sense of space different from that where he is actually sitting, receiving the impression that he is actually in an environment depicted on the television. That is, the invention produces life-like and natural sounds, giving a sense of spatial immersion in the sounds.

According to another aspect of the invention all of the speakers and amplification may be located within a single unit, or within a television set, or very close to the television set. No connections to external components are required, except for a signal source. Alternatively, there may be a remote speaker system used for bass reproduction. No connection to external components are required, except to the bass system and signal source.

Other features and advantages of the invention will be apparent from the following detailed description and from the claims, when read in connection with the accompanying drawing in which:

DETAILED DESCRIPTION

Figure 1:
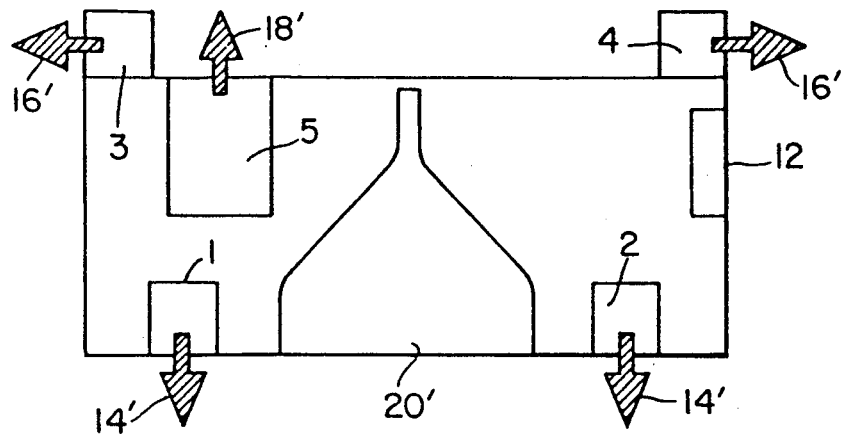
FIG. 1 is a diagrammatic representation of the top view of a video playback console.
Figure 2:
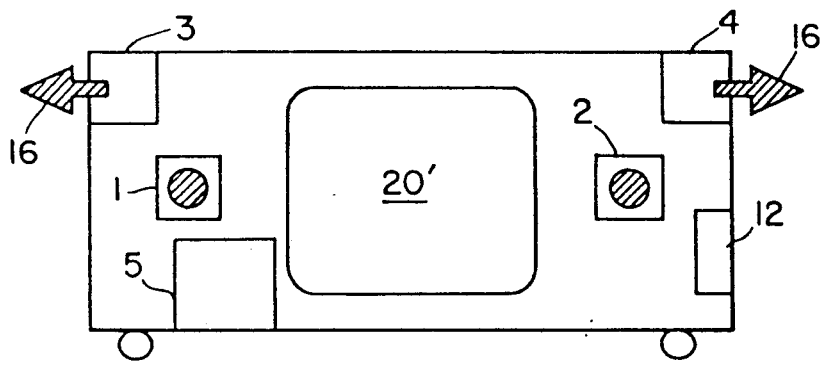
FIG. 2 is a front diagrammatic view of the console shown in FIG. 1.

Referring to FIGS. 1 and 2, there are shown top and front diagrammatic views respectively, of a video playback console. Video playback console 20', e.g., a television console, a film screen or a computer screen, has speakers 1, 2, 3 and 4, respectively, e.g., four tweeters, and speaker 5, e.g. a woofer. Console 20' also has an amplifier 12 having left and right channels.

Figure 3:
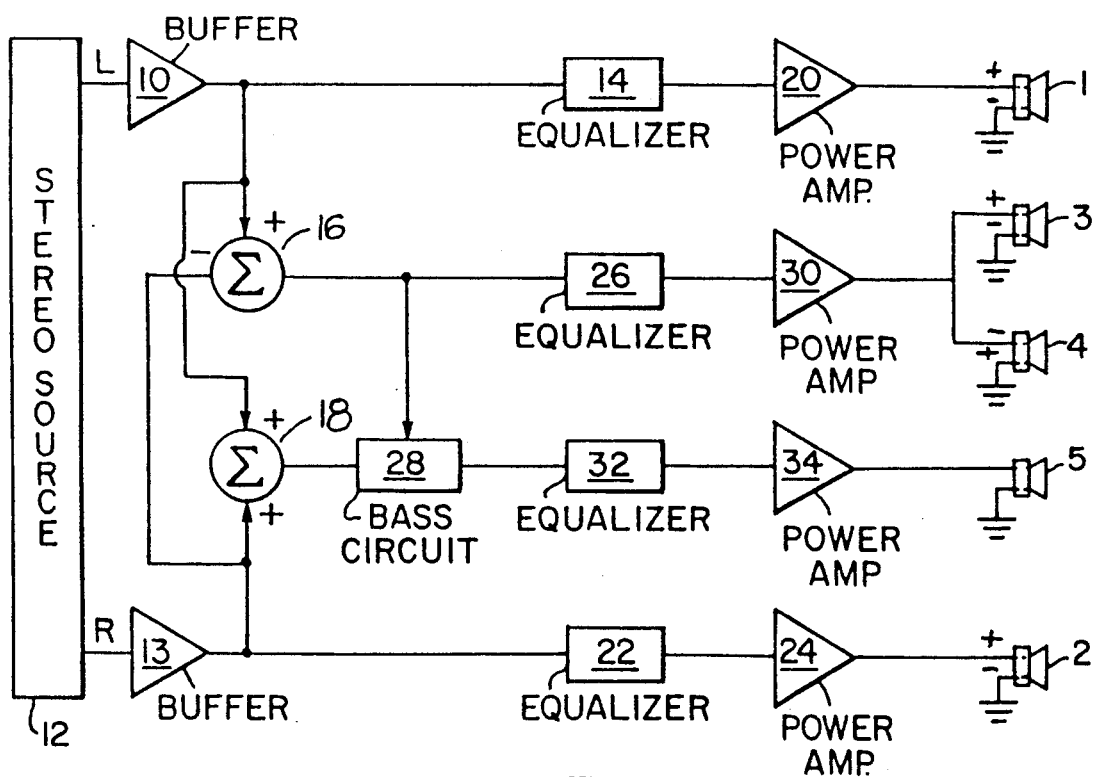
FIG. 3 is a block diagram showing the logical arrangement of an amplifier with five speakers in a video playback console according to the invention.

Referring to FIG. 3, there is shown a block diagram illustrating the logical arrangement of a system according to the invention. The left and right channels from stereo source 12 labeled L and R, respectively, are inputted to buffers 10 and 13, respectively. Buffer 10 outputs a signal to equalizer 14, the positive input of subtraction circuit 16 and addition circuit 18. Equalizer 14 outputs a signal through left main power amplifier 20 to the positive input of left speaker 1; the negative input of speaker 1 is connected to ground. Buffer 13 outputs a signal to equalizer 22, the negative input of subtraction circuit 16 and addition circuit 18. Equalizer 22 outputs a signal through right main power amplifier 24 to the positive input of right speaker 2; the negative input of speaker 2 is connected to ground.

The output of subtraction circuit 16 is inputted to equalizer 26 and to bass circuit 28. Equalizer 26 outputs a signal to ambience power amplifier 30. The output of power amplifier 30 is inputted to the positive input of left ambience speaker 3 and the negative input of right ambience speaker 4. The negative input of speaker 3 and the positive input of speaker 4 are connected to ground.

The output of addition circuit 18 is inputted to bass circuit 28, which enables bass from L and R channels to drive speaker 5. Bass circuit 28 takes the ratio of L+R voltage to L-R voltage. This ratio is a measure of stereo content, and is used to adjust the gain of the L+R bass signal to keep perceived spectral balance constant independent of amount of stereo content. Gain is approximately equal to $$1 + A\left(\frac{|L-R|}{|L+R|}\right)$$

where total boost is limited to 6 db. Bass circuit 28 outputs a signal through equalizer 32 and bass power amplifier 34 to speaker 5.

Speakers 1-4 are e.g. 5 cm midrange (8 ohm) tweeters mounted in sealed enclosures with a 0.6 liter internal volume and a pass band of 180 Hz-15 KHz. Speaker 5 is e.g. a 15 cm woofer (1 ohm) in an enclosure of the type described in U.S. Pat. No. 4,549,631 having a 3.3 liter volume, 50 to 150 Hz tuning, and a pass band of 40 Hz-180 Hz.

Equalization of the apparatus is performed by equalizing speakers 1, 2, and 5 for the desired sound, measuring the response of speakers 1 and 2 and adjusting the characteristics (e.g., mass and inductance) and/or adding passive components in series or parallel to make speakers 3 and 4 have similar spectral balance to speakers 1 and 2, allowing for the spectrum of the ambient content of typical program material. The signal level of speakers 3 and 4 is adjusted relative to that of speakers 1 and 2 in order to provide an appropriate perception of image width. Typically, the level of speakers 3 and 4 is adjusted to be 5 db higher than the level of speakers 1 and 2. Typically, adjustment is made by putting in noise or other test signal to left channel input 12, and adjusting amplifier gain so that acoustic output from speaker 3 is 5 db higher than acoustic output from speaker 1. Electronic equalization may also be employed to improve spectral balance. The equalizing circuits may be for establishing the ambience channel spectral balance similar to that of the main channel for typical program material, typically a gentle rolloff beginning at 2 kHz and 3 db down at 15 kHz for the ambience channel.

Referring again to FIGS. 1 and 2, speakers 1 and, 2 are positioned to direct sound forward, as shown by arrows 14', from video playback device 10 directly toward a viewer. Preferably, they direct sound in a plane perpendicular to the viewing plane of the video playback device; however, they may be positioned to direct sound within an area defined by planes angled at between 0° and 45° from the plane of the television screen. Speakers 3 and 4 are positioned to direct sound sideways or, to the rear of video playback device 10, as shown by arrows 16'. Preferably, sound is directed in a plane parallel to the plane of video screen 20, as shown in FIGS. 1 and 2. However, the sound may be directed in an area defined by a plane at 0°-45° to the plane of video screen 20, or in any rearward direction. Most preferably the speakers are angled as shown in the Figures, or in a 0°-45° plane to the rear of the video playback device from that shown. Speaker 5 typically directs sound rearward, as shown by arrow 18'.

OTHER EMBODIMENTS

Other embodiments are within the following claims. For example, stereo source 12 may be provided with a difference amplification channel which allows the user to change the character of the sound in a manner independent of speakers 1 and 2. This change is dependent upon the particular character of sound being reproduced at any time. For example, the gain on any one channel may be changed, the frequencies may be equalized, and there may be a time delay between various channels. For example, when mainly monophonic sound is being aired (such as for a news program) the speakers producing sound directly to a viewer might be augmented, and the output from the indirect speakers lessened. If stereo sound is aired, the indirect speakers might be augmented. Further signal processing, such as Dolby decoding, compression, delay, reverb, or other dynamic effects to enhance spatial sound may also be included.

Speakers 3 and 4 may derive the L-R and R-L signals respectively by connecting directly to the left and right channels of a stereo amplifier. In this embodiment, the positive input of speaker 3 is connected to the left positive output of the amplifier, and the negative input to the right positive output of the amplifier (to provide an L-R signal); speaker 4 is connected between the same two outputs but in opposite polarity, to produce an R-L signal. Alternatively, in a series configuration, the positive input of speaker 3 is connected to the left positive output of the amplifier, the negative input to the negative input of speaker 4, and the positive input of speaker 4 to the right positive output of the amplifier.

The spectrum of speakers 3 and 4 need not equal that of speakers 1 and 2; and speakers 1 and 2 and speaker 5 may be replaced by any standard stereo speaker system placed within 2-3 feet of the television set. In addition, speakers 1 and 2 and speaker 5 may be replaced by, or augmented by, a center (L+R) speaker, to improve monophonic sound.

Speakers 3 and 4 may be moved 2-3 feet from the video display device set; or the whole set of speakers may be mounted in a self-contained module for placement above or below the video display device.

Speakers 3 and 4 may be placed three or more feet to either side of the video display device and angled in any suitable direction, including forwards, to create the desired width of audio image.

Speakers 3 and 4 may, through appropriate changes in circuitry and amplifier function, reproduce appropriate stereo signals for improved reproduction of audio material which does not have video associations.

Additionally, if speakers 1-4 are replaced by full range speakers then speaker 5, and its associated circuitry, is not necessary.

Other embodiments are within the following claims.

What is claimed is:

1. Sound projection apparatus for a video and audio playback device, having a video display device, comprising;
   left and right speakers,
   left and right ambience speakers,
   an amplifier having a right channel and a left channel for carrying R and L signals respectively, and ambience circuitry,
   said left channel being coupled to said left speaker,
   said right channel being coupled to said right speaker,
   said left and right channels being coupled to said ambience circuitry,
   said ambience circuitry being coupled to said left ambience speaker and said right ambience speaker for radiating respective L-R and R-L ambience signals which ambience signals are essentially zero when said L and R signals are equal,
   wherein said right and left speakers are forward facing, projecting sound directly from the video display device to the viewer,
   wherein said left and right ambience speakers are positioned to respectively radiate primarily to the left and right of said video display device to provide a sound image perceived by a viewer to extend significantly to the side of said video display device when said L and R signals are unequal, and
   wherein said right and left speakers are located in front of the viewer to provide a sound image perceived by a viewer to come from said video display device when said L and R signals are equal.

2. The apparatus of claim 1, wherein said left speaker is on the left side of said right speaker.

3. The apparatus of claim 1, wherein said left and right ambience speakers do not face forward along a line between 0° and 45° from a plane drawn perpendicular to the viewing plane of the video display device.

4. The apparatus of claim 1, wherein said left and right ambience speakers are positioned such that said left ambience speaker is on the left side of said right ambience speaker.

5. The apparatus of claim 1, wherein said speakers are tweeters, and said apparatus further comprises a woofer.

6. The apparatus of claim 1, wherein said right and left speakers face along a line between 0° to b 45° from a plane drawn perpendicular to the viewing plane of the video display device.

7. The apparatus of claim 1 and further comprising means for establishing the sound energy radiated by said left and right ambience speakers greater than the sound energy radiated by said left and right speakers by a predetermined audible difference.

8. The apparatus of claim 7 wherein said predetermined audible difference is substantially 5 db.

9. The apparatus of claim 1 wherein said left and right ambience speakers are positioned a significant distance to the left and right respectively of said video playback device.

10. The apparatus of claim 9 wherein said distance is at least substantially three feet.

11. The apparatus of claim 1 wherein said speakers are full range speakers.

12. The apparatus of claim 1 wherein said ambience circuitry includes ambient equalizing circuitry for establishing the spectral balance of said first and second ambience signals similar to that of the sound energy radiated by said left and right speakers for typical program material.

13. The apparatus of claim 12 wherein said ambience equalizing circuitry is characterized by a frequency response having a gentle rolloff beginning at 2 kHz and substantially 3 db down at 15 kHz.

14. Sound projection apparatus in accordance with claim 1 and further comprising a variable gain bass circuit coupled to said left and right channels for amplifying a bass signal related to the sum of the bass spectral components in said L and said R signals,
   said variable gain being related to the ratio of the magnitudes of one of said left and right ambience signals and said sum.

15. Sound projection apparatus in accordance with claim 14 wherein the said variable gain is a minimum when said L and R signals are equal and a maximum when only one of said L and R signals is zero.

16. Sound projection apparatus in accordance with claim 15 wherein said variable gain is approximately equal to $$1 + A\left(\frac{|L - R|}{|L + R|}\right).$$

17. Sound projection apparatus in accordance with claim 14 wherein said speakers are full range speakers.

18. Sound projection apparatus in accordance with claim 14 wherein said speakers are mid-range tweeters and further comprising, a woofer coupled to the output of said bass circuit.

19. Sound projection apparatus for a video and audio playback device, having a video display device, comprising;

left and right speakers, first and second ambience speakers, an amplifier having a right channel and a left channel, and ambience circuitry, said left channel being coupled to a left speaker, said right channel being coupled to a right speaker, said left and right channels being coupled to said ambience circuitry, said ambience circuitry being coupled to said first ambience speaker and said second ambience speaker for radiating respective first and second ambience signals, wherein said right and left speakers are forward facing, projecting sound directly from the video display device to the viewer, wherein said first and second ambience speakers are positioned to provide a sound image perceived by a viewer to extend significantly to the left and right of said video display device, and wherein said right and left speakers are located in front of the viewer, wherein said ambience circuitry includes ambient equalizing circuitry for establishing the spectral balance of said first and second ambience signals similar to that of the sound energy radiated by said left and right speakers for typical program material, wherein said ambience equalizing circuitry is characterized by a frequency response having a gentle rolloff beginning at 2 kHz and substantially 3 db down at 15 kHz.

20. A method for producing an improved sound from an audio and video playback device, having a video display device, comprising the steps of:

providing a sound projection apparatus for said audio and video playback device, said apparatus comprising left and right speakers, left and right ambience speakers, an amplifier having a right channel and a left channel for carrying R and L signals respectively, and an ambience circuit, said right channel being coupled to said right speaker, said left channel being coupled to said left speaker, said left and right channels being coupled to said ambience circuit, said ambience circuit being coupled to said left ambience speaker and said right ambience speaker for radiating respective left and right ambience signals, positioning said left and right speakers to project sound directly from the video display device to a viewer, and positioning said left and right ambience speakers to radiate sound energy primarily to the left and right respectively to project sound indirectly to the viewer, applying said L and R signals to said left and right speakers respectively, differentially combining said L and R signals to provide an L-R signal and an R-L signal, and applying said L-R and said R-L signals to said left and right ambience speakers respectively to provide a sound image perceived by a viewer to extend significantly to the side of said video display device when said L and R signals are unequal and to come from said video display device when said L and R signals are equal.

21. In a stereo system having left and right channels for transmitting left and right signals of a stereo signal apparatus comprising, a variable gain bass circuit coupled to said left and right channels for amplifying a bass signal related to the sum of the bass spectral components in said left and said right signals, ambience circuitry coupled to said left and right channels for providing a first ambience signal representative of said left signal minus said right signal and a second ambience signal representative of said right signal minus said left signal, and means for establishing said variable gain related to the ratio of the magnitudes of one of said first and second ambience signals and said sum.

22. Stereo apparatus in accordance with claim 21 wherein the said variable gain is a minimum when said left and right signals are equal and a maximum when only one of said left and right signals is zero.

23. Stereo apparatus in accordance with claim 22 wherein said variable gain is approximately equal to 1 plus A times the ratio of the magnitude of said left signal minus said right signal to the magnitude of said left signal plus said right signal.

* * * * *